United States Patent

Dychdala et al.

[15] 3,645,005

[45] Feb. 29, 1972

[54] CALCIUM HYPOCHLORITE MANUFACTURE

[72] Inventors: George Roman Dychdala, Norristown, Pa.; Robert James Cox, Brownsville, Tex.

[73] Assignee: Pennwalt Corporation, Philadelphia, Pa.

[22] Filed: Apr. 14, 1970

[21] Appl. No.: 28,529

[52] U.S. Cl. ................................................34/22, 23/86
[51] Int. Cl. ................................................F26b 3/00
[58] Field of Search ..................................34/22; 23/86

[56] References Cited

UNITED STATES PATENTS

| | | | |
|---|---|---|---|
| 3,544,267 | 12/1970 | Dychdala | 23/86 |
| 2,901,435 | 8/1959 | Robson | 23/86 X |
| 1,743,242 | 1/1930 | Schultze | 23/86 X |
| 1,937,230 | 11/1933 | Kitchen | 23/86 |

*Primary Examiner*—Carroll B. Dority, Jr.
*Attorney*—Stanley Litz and Carl A. Hechmer, Jr.

[57] ABSTRACT

Calcium hypochlorite compositions, containing at least about 65 percent $Ca(OCl)_2$ on a dry weight basis and which are resistant to exothermic, self-propagating decomposition, are prepared by charging the wet crystals of neutral calcium hypochlorite dihydrate from the synthesis operation to a dryer and removing the product therefrom when the water content is within the range of 6 percent to 15 percent by weight.

4 Claims, No Drawings

CALCIUM HYPOCHLORITE MANUFACTURE

This invention relates to a method of preparing a high-grade calcium hypochlorite composition that is resistant to exothermic, self-propagating decomposition. More particularly, this invention concerns a method wherein the wet calcium hypochlorite composition obtained from typical synthesis operations is charged to a dryer from which it is removed when the water content thereof ranges from 6 to 15 percent by weight.

High-grade calcium hypochlorite compositions are primarily used for water treatment, especially of swimming pools, where it serves as a convenient source of chlorine for disinfectant purposes and for general sanitation. It is normally shipped in 1- and 2-lb. bottles, packages containing from 3.75 to 35 lbs., and 100-lb. drums. The usual commercial products are substantially dry, i.e., having a water content of less than about 1 percent, and are largely comprised of small granules. However, there is present in these products a significant amount, e.g., from about 0.1 percent to about 2 percent, of undesired dusty fines having a particle size range such that they pass through a 200 mesh screen (Tyler Screen Scale) and usually through a 325 mesh screen. It has been generally accepted by the trade that the stability of these dry calcium hypochlorite compositions is inversely proportional to the water content. Said dry products normally lose from 1 percent to about 4 percent of their available chlorine content per year in storage.

The major disadvantages, however, of the dry calcium hypochlorite compositions relate to their instability and tendency to undergo a self-sustaining and self-propagating decomposition which will spread through the entire batch until decomposition is complete. The decomposition may be initiated by the accidental touching of a live flame or spark to the calcium hypochlorite, as for example, the accidental contact of a lit match or cigarette thereto. Decomposition may also be initiated by contacting the calcium hypochlorite with just a single drop of organic material, for example, glycerine, an alcohol, a variety of hydrocarbons such as petroleum oil and many others. The decomposition evolves gaseous chlorine which constitutes a toxic hazard to personnel in the area, and also evolves oxygen which intensifies a fire that might reach stored quantities of calcium hypochlorite. The method of this invention provides a calcium hypochlorite composition which is resistant to this decomposition hazard.

Several commercial processes are currently used for the manufacture of the high-grade calcium hypochlorite compositions containing at least about 65 percent $Ca(OCl)_2$, from which the active and available chlorine is derived.

In one process, lime in aqueous slurry, or a mixture of lime and dibasic calcium hypochlorite ($Ca(OCl)_2 \cdot 2Ca(OH)_2$), is chlorinated to produce a solution of calcium hypochlorite. The liquor is clarified to exclude the lime impurities and then treated with an alkali metal salt to salt out (precipitate) crystals of neutral calcium hypochlorite dihydrate ($Ca(OCl)_2 \cdot c[H_2O]$). In another process, a slurry of hydrated lime and caustic soda is chlorinated and subsequently cooled to −10° F. The crystals which form are centrifuged to remove the mother liquor and most of the insoluble impurities. The mixture is warmed to precipitate crystals of neutral calcium hypochlorite dihydrate, leaving most of the sodium chloride in solution in a product slurry ready for separation. In another process, crystals of dibasic calcium hypochlorite in aqueous suspension are chlorinated to obtain a slurry of neutral calcium hypochlorite dihydrate in a mother liquor of reduced calcium chloride content. In yet another process, heavy lime slurry is chlorinated at 40°–45° C. forming large crystals of hemibasic calcium hypochlorite ($Ca(OCl)_2 \cdot \frac{1}{2} Ca(OH)_2$). The hemibasic crystals are suspended in a thin lime slurry and chlorinated, resulting in the formation of a slurry of laminar crystals of neutral calcium hypochlorite dihydrate.

In the product recovery step of all of the foregoing and similar processes and their several modifications, crystals of neutral calcium hypochlorite dihydrate containing various salt impurities are separated from the aqueous mother liquors by filtration or centrifugation of the slurry. These so-called high-grade calcium hypochlorite compositions contain, based on dry weight of the composition, at least about 65 percent, normally about 70–75 percent, and in some cases up to about 85 percent or more by weight of $Ca(OCl)_2$, the remaining constituents being sodium chloride, calcium chlorate, calcium hydroxide, calcium carbonate and calcium chloride. A typical product will have the following approximate chemical analysis on a dry weight basis.

|  | Percent by weight |
|---|---|
| Calcium hypochlorite | 74 |
| Calcium chlorate | 1.5 |
| Calcium hydroxide | 3 or less |
| Calcium chloride | 2 or less |
| Calcium carbonate | 2 |
| Sodium chloride | 17.5 |

It has been the practice heretofore to separate the calcium hypochlorite composition from the aqueous medium as described above and then to dry the wet cake until it contains less than 1 percent water, a procedure that gives the conventional product which offers the aforedescribed fire hazards and is prone to exothermic, self-propagating decomposition.

In accordance with the present invention, the crystals of the calcium hypochlorite composition in aqueous slurry, as described above, are separated from the aqueous mother liquor by filtration or centrifugation to provide a wet cake of the composition containing from about 25 percent to about 45 percent, preferably about 30 to 40 percent, by weight of water. This moist product is then passed through the drying zone of an air dryer and withdrawn from the dryer when the water content of the calcium hypochlorite composition is within the range of 6 to 15 percent (based on total weight), preferably about 7 to 12 percent by weight of water.

The air dryers used in the method of this invention are conventional types such as the continuous tray types or the continuous belt types. An important advantage of the practice of this invention is the elimination of costly and dangerous dryer fires presently encountered in calcium hypochlorite plants.

Said partial drying of the calcium hypochlorite composition is carried out at atmospheric pressure at temperatures within the range of about 100° to about 200° F. From about 100 to 200 minutes of drying time is usually sufficient to obtain the desired moisture content. Single stage or multistage drying may be employed. The product, a particulate product calcium hypochlorite composition, containing at least about 65 percent by weight $Ca(OCl)_2$ based on dry weight of the composition, and from 6 to 15 percent water based on total weight, has a granular configuration comprised of particles ranging from 0.05 mm. to about 2.5 mm., with the majority, i.e., at least about 99 percent of the particles being greater than 0.149 mm. (Tyler screen 100 mesh).

The following examples illustrate the method of the invention and demonstrate the results achieved by its practice.

A representative high-grade calcium hypochlorite composition is prepared using a well-known synthesis technique as follows: A mixture of hydrated lime and dibasic calcium hypochlorite is chlorinated and the mixture is filtered. Sodium chloride is added to the clarified liquid with gentle mixing to precipitate neutral calcium hypochlorite dihydrate crystals. The slurry is centrifugated to separate the mother liquor containing dissolved salt. The wet cake, containing about 30 percent water, is then passed through a first stage dryer at about 180° F. where about half of the water is volatilized (to about 18–20 percent level), and then passed through a second stage hot air dryer wherein the cake temperature ranges from 100° to 200° F. Portions of the calcium hypochlorite composition are removed from the dryer at various stages of moisture levels. Some of the material, however, is taken to substantial dryness, as is the practice in the industry; it contains less than 1 percent water and its $Ca(OCl)_2$ content is about 74 percent. In order to demonstrate the dangerous reactivity of this substantially dry calcium hypochlorite product, representative test samples (a test sample may consist of about 10 to 500 grams) are contacted with a lit match or burning cigarette (the "Ignition" test) resulting in immediate ignition, blinding flame, and total destruction of the mass of material by self-propagation of the decomposition reaction; other test samples of this dry product are contacted with a drop of glycerine resulting in a delayed reaction of fire, fuming, carbonization, and propagation to complete destruction; other samples are contacted with a drop of 2-propanol plus ignition with a lit match or cigarette resulting in immediate reaction with blinding flame and propagation to total destruction with complete fusion of the mass.

In contrast, the partially dried calcium hypochlorite, previously removed from the dryer at water levels ranging from 6 to 15 percent by weight of the total composition, is remarkably stable to exothermic self-propagating decomposition. In a series of stability tests as described above, these products are almost nonflammable to ignition by either lit match or burning cigarette and are much less reactive to organic contamination, such as addition of glycerol. The difference in reactivity is striking, e.g., the reaction time is delayed, the reaction is less vigorous, and, most significantly, the reaction is localized, without further propagation.

A typical screen analysis of the partially dried material (containing 74 percent $Ca(OCl)_2$ on a dry weight basis and 10.4 percent of water) is as follows:

| Tyler Screen | Size | Distribution Sample No. 1 | Sample No. 2 |
|---|---|---|---|
| +10 | 2.0 mm. | 8% | 2% |
| +16 | 1.19 mm. | 37% | 21% |
| +100 | 0.149 mm. | 55% | 77% |
| +200 | 0.074 mm. | Trace | Trace |
| +325 | 0.044 mm. | Trace | Trace |

The storage stability of representative partially dried compositions (containing 6.5 percent, 9 percent, 10 percent, and 11 percent water levels) is measured after storage at ambient temperatures for 277 days. The loss of available, active chlorine from the compositions is surprisingly very small, ranging from about 1 to 3.6 percent of active chlorine initially available, that is, a loss no greater than that of substantially dry compositions.

We claim:

1. A method of preparing a calcium hypochlorite composition that is resistant to exothermic, self-propagating decomposition which comprises passing wet calcium hypochlorite composition comprised of crystals of neutral calcium hypochlorite dihydrate containing from about 25 to about 45 wt. percent water on a total weight basis and at least about 65 percent $Ca(OCl)_2$ on a dry weight basis through a heated drying zone and withdrawing partially dried composition from said zone when the water content thereof is within the range of 6 to 15 percent by weight.

2. The method of claim 1 wherein the water content of the partially dried composition is from 7 to 12 percent.

3. The method of claim 1 wherein the $Ca(OCl)_2$ content of the composition is at least about 70 percent.

4. The method of claim 3 wherein the water content of the partially dried composition is from 7 to 12 percent.

* * * * *

PO-1050
(5/69)

UNITED STATES PATENT OFFICE
CERTIFICATE OF CORRECTION

Patent No. 3,645,005     Dated  March 16, 1972

Inventor(s) George Roman Dychdala and Robert James Cox

It is certified that error appears in the above-identified patent and that said Letters Patent are hereby corrected as shown below:

Column 1, line 56 "$(Ca(OCl)_2c(H_2O)$" should read

--$(Ca(OCl)_2 \cdot 2H_2O)$.--

In the table column 2

" Calcium hypochlorite

74                                                                     "

should be

-- Calcium Hypochlorite            74--

Signed and sealed this 27th day of June 1972.

(SEAL)
Attest:

EDWARD M. FLETCHER, JR.                ROBERT GOTTSCHALK
Attesting Officer                      Commissioner of Patents